L. GELFOND.
SPRING WHEEL.
APPLICATION FILED SEPT. 9, 1921.
1,420,251. Patented June 20, 1922.
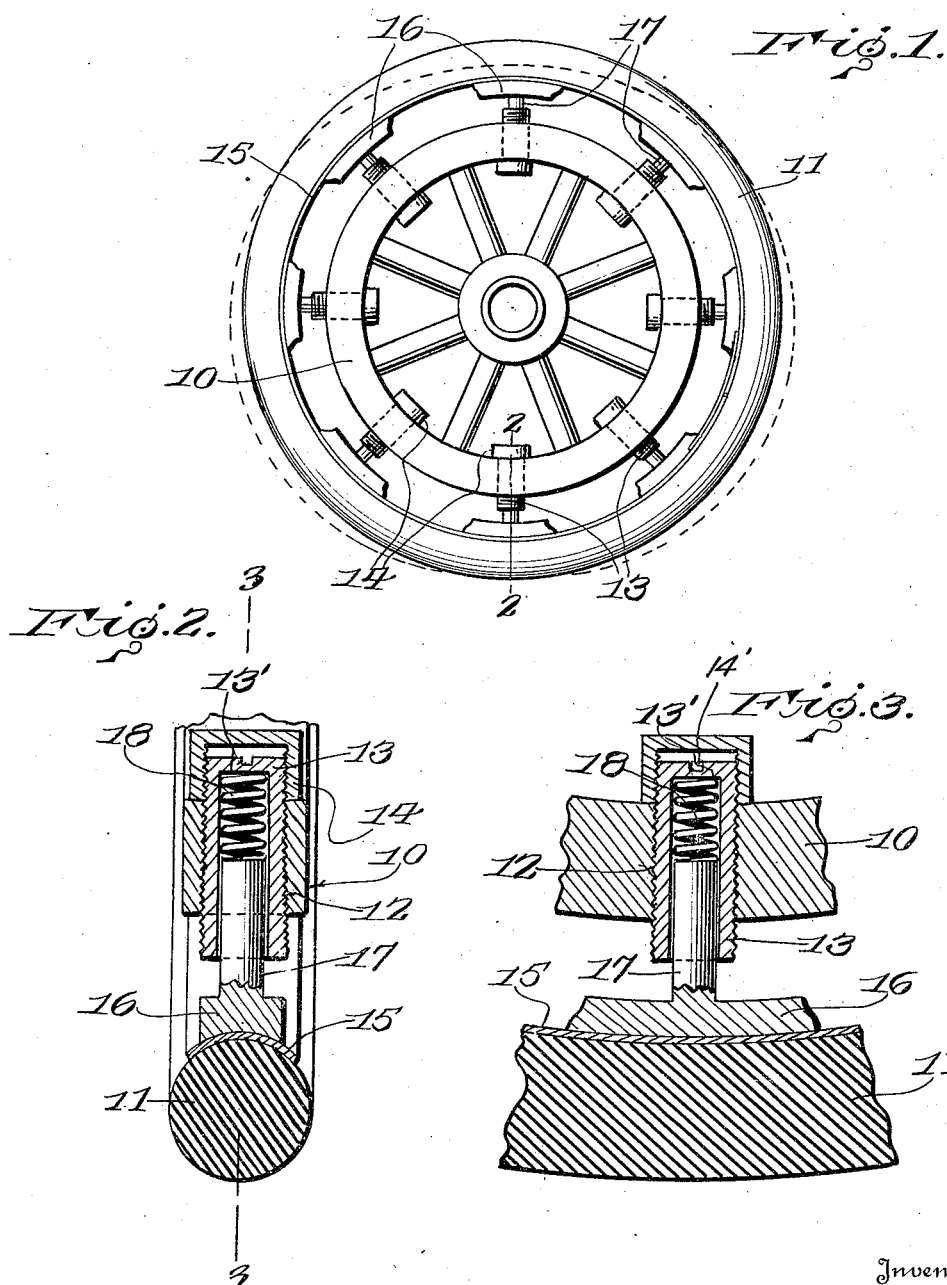

UNITED STATES PATENT OFFICE.

LOUIS GELFOND, OF NEWPORT NEWS, VIRGINIA.

SPRING WHEEL.

1,420,251.　　　　　　　Specification of Letters Patent.　　Patented June 20, 1922.

Application filed September 9, 1921. Serial No. 499,402.

*To all whom it may concern:*

Be it known that I, LOUIS GELFOND, a citizen of the United States, residing at Newport News, in the county of Warwick, State of Virginia, have invented certain new and useful Improvements in Spring Wheels; and I do hereby declare the following to be a full, clear, and exact description of the invention, such as will enable others skilled in the art to which it appertains to make and use the same.

This invention relates to new and useful improvements in wheels and particularly to resilient wheels, and tires therefor.

One object of the invention is to provide a resilient tire for attachment to the ordinary automobile wheel which is simple in construction, and which is possessed of the desired amount of resiliency similar to that of the pneumatic tire.

Another object is to provide a tire for a wheel which includes a resilient rim capable of flexing movement under strain of a load.

Other objects and advantages will be apparent from the following description when taken in connection with the accompanying drawing.

In the drawing:

Figure 1 is a side elevation of a wheel equipped with the improved tire.

Figure 2 is an enlarged vertical transverse sectional view through one of the spring containing tubular members, on the line 2—2 of Figure 1.

Figure 3 is a vertical sectional view taken centrally through Figure 2, on the line 3—3.

Referring particularly to the accompanying drawing, 10 represents the felly of the wheel 11, and formed through this felly, in a direction radially from the center thereof, are the threaded openings 12. Disposed through each of these openings 12 is an externally threaded tubular member 13, a cap 14 being screwed on the end thereof, inwardly of the felly.

The inner end of each member 13 is formed with a transverse groove 14' for application of a screw driver, to turn said member inwardly or outwardly.

Disposed concentrically outward of the felly 10 is a flexible metal rim 15, the same being spaced from the felly at the required distance. Secured to the inner face of the rim 15, at points radially opposite the tubular members 13, are the blocks, 16, and rigidly secured in each of these blocks, and extending into a member 13, is a pin 17. Within each tubular member 13 is disposed a strong coil spring 18, on the outer end of which the end of the pin 17 rests. The other end of the coil spring 18 rests on the inner or bottom wall 13' of the tubular member 13.

The tension of the springs 18 may be adjusted by turning the members 13 in one direction or the other, as it will be readily understood.

As the body of the wheel is depressed, under the weight of a load, the lower portion of the felly will approach the lower portion of the flexible rim 15, with the result that the upper portion of the rim will be drawn downwardly toward the upper portion of the felly, and the forward and rearward portions of the rim projected away from the felly. In other words, the rim 15 assumes an elliptical shape with its minor axis extending vertically through the axis of the wheel, and its major axis at right angles thereto, and in parallel relation to the ground. By this construction, the pins 17 will freely play inwardly and outwardly of the tubular members 13, compressing the springs, at some points and permitting some of the others to expand.

What is claimed is:

A spring wheel including a felly having a plurality of threaded openings therein, members adjustably supported within the said openings, each of said members having a longitudinal bore extending part way of its length, resulting in an open end and a closed end, an outer flexible rim disposed concentrically of the felly, pins secured to the outer rim and extending into the bores of the members, and a spring supported within each member and bearing at one end against the pin and at the other against the inner wall of the closed end.

In testimony whereof, I affix my signature, in the presence of two witnesses.

LOUIS GELFOND.

Witnesses:
　SAM SMITH,
　MICHAEL AXEL.